(12) United States Patent
Do et al.

(10) Patent No.: US 11,581,765 B2
(45) Date of Patent: Feb. 14, 2023

(54) INFERIOR PERMANENT MAGNET ELECTRIC MOTOR AND ROTOR INCLUDED THEREIN

(71) Applicants: Hyundai Motor Company, Seoul (KR); Kia Motors Corporation, Seoul (KR)

(72) Inventors: Sang Hwa Do, Gyeonggi-do (KR); Kyoung Bum Kim, Gyeonggi-do (KR); Yeon Ho Kim, Gyeonggi-do (KR); Jae Bum Park, Gyeonggi-do (KR); Nyeon Han Hong, Gangwon-do (KR); Hee Ra Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/566,114

(22) Filed: Sep. 10, 2019

(65) Prior Publication Data
US 2020/0212740 A1  Jul. 2, 2020

(30) Foreign Application Priority Data
Dec. 27, 2018  (KR) .................. 10-2018-0171114

(51) Int. Cl.
*H02K 1/27* (2022.01)
*H02K 1/276* (2022.01)
*H02K 29/03* (2006.01)

(52) U.S. Cl.
CPC .......... *H02K 1/2766* (2013.01); *H02K 29/03* (2013.01); *H02K 2201/06* (2013.01)

(58) Field of Classification Search
CPC .. H02K 1/2766; H02K 29/03; H02K 2201/06; H02K 21/14; H02K 1/16; H02K 2213/03
See application file for complete search history.

(56) References Cited

U.S. PATENT DOCUMENTS

| 8,643,239 | B2 * | 2/2014 | Takemoto | H02K 1/276 |
| | | | | 310/156.45 |
| 2002/0089243 | A1 * | 7/2002 | Isozaki | H02K 37/04 |
| | | | | 310/49.44 |
| 2009/0134732 | A1 * | 5/2009 | Shichijoh | H02K 1/276 |
| | | | | 310/156.53 |
| 2010/0166579 | A1 * | 7/2010 | Noh | H02K 5/12 |
| | | | | 310/216.106 |
| 2010/0244609 | A1 * | 9/2010 | Takahata | H02K 1/276 |
| | | | | 310/156.53 |
| 2013/0020889 | A1 * | 1/2013 | Yamamoto | H02K 1/27 |
| | | | | 310/59 |
| 2016/0087495 | A1 * | 3/2016 | Matsushita | H02K 1/276 |
| | | | | 310/156.48 |
| 2019/0006896 | A1 * | 1/2019 | Baba | H02K 1/2766 |

FOREIGN PATENT DOCUMENTS

KR   20160053560 A   5/2016

* cited by examiner

*Primary Examiner* — Thomas Truong
(74) *Attorney, Agent, or Firm* — Fox Rothschild LLP

(57) ABSTRACT

An interior permanent magnet electric motor forms a buried angle of a left permanent magnet of a slot part of a rotor differently from a buried angle of a right permanent magnet of the slot part of the rotor, so as to reduce torque ripple while sufficiently maintaining motor efficiency as compared to an I-type rotor to effectively improve noise, vibration, and harshness performance.

14 Claims, 3 Drawing Sheets

INFERIOR PERMANENT MAGNET ELECTRIC MOTOR AND ROTOR INCLUDED THEREIN

CROSS-REFERENCE TO RELATED APPLICATION

This application claims under 35 U.S.C. § 119(a) the benefit of Korean Patent Application No. 10-2018-0171114 filed on Dec. 27, 2018, the entire contents of which are incorporated herein by reference.

BACKGROUND

(a) Technical Field

The present disclosure relates to an interior permanent magnet electric motor, more particularly, to a rotor and a stator capable of enhancing efficiency and NVH performance of the interior permanent magnet electric motor.

(b) Description of the Related Art

A drive motor for an eco-friendly vehicle typically is an Interior Permanent Magnet (IPM) Motor type to provide high output/high efficiency. In a motor for a vehicle, an important factor to be considered with respect to motor efficiency is Noise, Vibration, and Harshness (NVH) performance. The NVH performance of the motor is also an important performance factor directly related to the driving performance of the vehicle and driver satisfaction.

However, since motor efficiency and the NVH performance are generally in a trade-off relationship, it is difficult to enhance these two characteristics simultaneously.

In order to enhance the motor efficiency, methods such as changing materials of an electric steel plate and a permanent magnet, enhancing a fill factor (a coil area per a slot area), and improving a bearing for minimizing a mechanical hand are applied thereto, but these methods have a disadvantage in that a manufacturing cost greatly increases.

Meanwhile, as a method for improving the NVH performance, there are methods for increasing the number of poles/slots, applying a stator/rotor core skew (spin stack), and the like, but in this case, there are the disadvantages in that a manufacturing cost increases and motor efficiency may be reduced.

The above information disclosed in this Background section is only for enhancement of understanding of the background of the disclosure and accordingly it may contain information that does not form the prior art that is already known in this country to a person of ordinary skill in the art.

SUMMARY

The present disclosure is configured to effectively enhance motor efficiency and to substantially improve NVH performance by changing only some shapes such as a buried structure of a permanent magnet inside an electric motor, thereby maximizing fuel efficiency and quietness of a vehicle.

One preferred embodiment of the present disclosure provides a rotor of an interior permanent magnet electric motor, which is formed with a plurality of slot parts at an edge of a rotor core in a circumferential direction thereof, having a first permanent magnet and a second permanent magnet, which form a single magnetic pole, inserted into and fixed to one of the slot parts, and formed so that a buried angle $\theta_1$ of the first permanent magnet has a different angle from a buried angle $\theta_2$ of the second permanent magnet.

In addition, the present disclosure provides the rotor of the interior permanent magnet electric motor in which with respect to the rotation direction of the rotor, the buried angle of a first one of the first and second permanent magnets in the rotation direction thereof is greater than the buried angle of a second one of the first and second permanent magnets.

For example, the present disclosure may be the rotor of the interior permanent magnet electric motor in which when the main rotation direction of the rotor is counterclockwise, the buried angle $\theta_1$ of the first permanent magnet is formed at an angle greater than the buried angle $\theta_2$ of the second permanent magnet.

On the contrary, the present disclosure may be the rotor of the interior permanent magnet electric motor in which when the main rotation direction of the rotor is clockwise, the buried angle $\theta_2$ of the second permanent magnet is formed at an angle greater than the buried angle $\theta_1$ of the first permanent magnet.

In addition, the buried angle $\theta_1$ of the first permanent magnet and the buried angle $\theta_2$ of the second permanent magnet may be an angle selected within a range of 5 degrees to 10 degrees, respectively.

Preferably, the buried angle $\theta_1$ of the first permanent magnet may be 7 degrees, and the buried angle $\theta_2$ of the second permanent magnet may be 5 degrees.

In addition, according to another embodiment of the present disclosure, a pair of rotor notches may be formed on the slot part of the rotor, and the rotor notches may be asymmetric notches in which at least one of the widths and the angles thereof is different from each other.

In addition, the present disclosure provides the rotor of the interior permanent magnet electric motor in which a plurality of V-shaped grooves are formed on the outer circumferential surface of the rotor core in the circumferential direction thereof, and each of the V-shaped grooves is interposed between the slot parts.

Meanwhile, the present disclosure provides an interior permanent magnet electric motor including a rotor as described above, and a stator in a ring shape coaxially disposed on the outer circumference of the rotor at a certain interval.

Preferably, the stator includes a yoke in a ring shape, a plurality of teeth inwardly extended from the yoke, and a plurality of shoes formed on the end portion of the teeth to face the outer circumferential surface of the stator, and a pair of stator notches formed toward the rotor may be formed on the shoe, and the pair of stator notches formed on the respective shoes may be composed of asymmetric notches in which at least one of the widths and the angles thereof is different from each other.

According to the present disclosure, it is possible to disperse the magnetic flux concentrated saturation region while maximizing the utilization of the reluctance torque when the torque of the electric motor is generated, thereby reducing the torque ripple.

In particular, according to the present disclosure, it is possible to form the buried angle of the left permanent magnet of the slot part of the rotor differently from the buried angle of the right permanent magnet, thereby reducing the torque ripple while sufficiently improving and maintaining the motor efficiency as compared to an I-type rotor to effectively improve the NVH performance.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
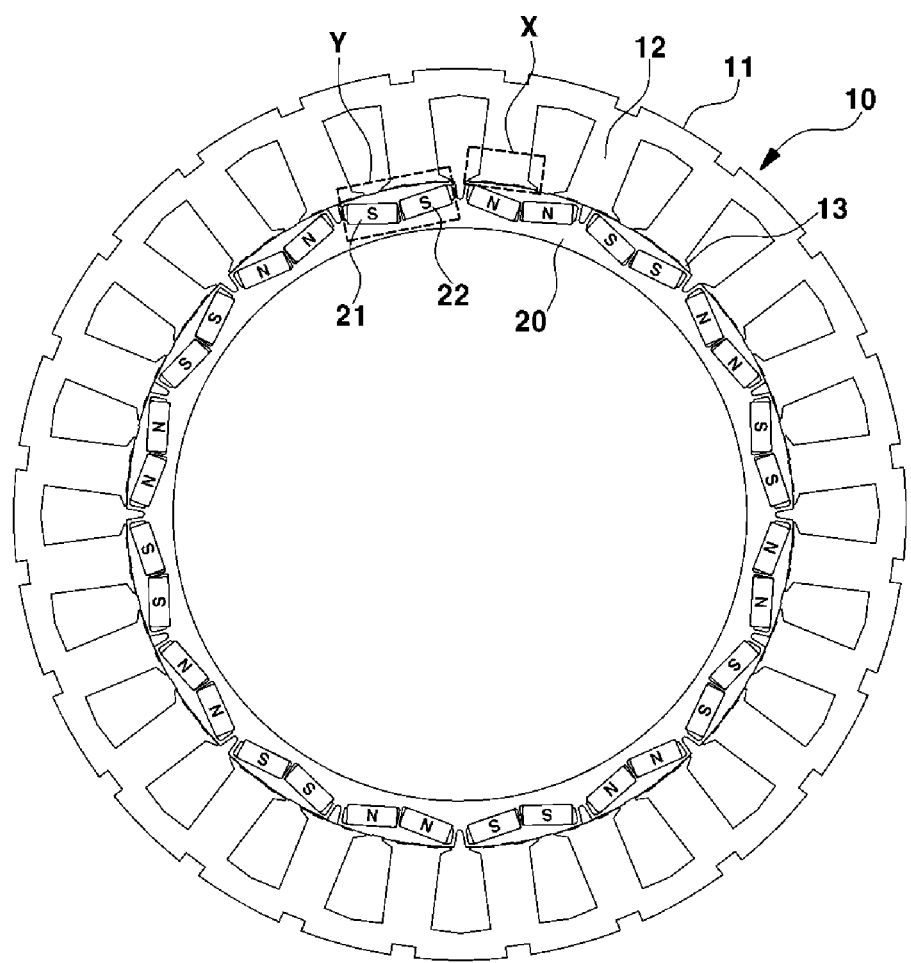
FIG. 1 is a schematic plan diagram of an interior permanent magnet electric motor according to a preferred embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims. In the following description of the embodiments, the same elements are denoted by the same reference numerals even though they are depicted in different drawings Hereinafter, an interior permanent magnet electric motor according to a preferred embodiment of the present disclosure will be described in detail with reference to the accompanying drawings.

Figure 2:
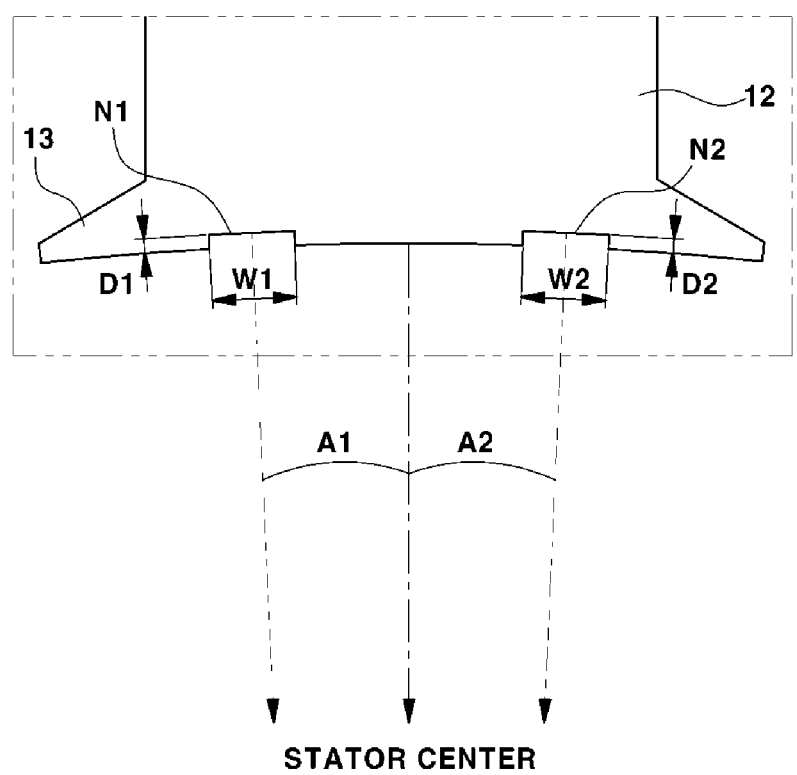
FIG. 2 is an enlarged diagram of a main portion X of a stator of the interior permanent magnet electric motor illustrated in FIG. 1.
Figure 3:
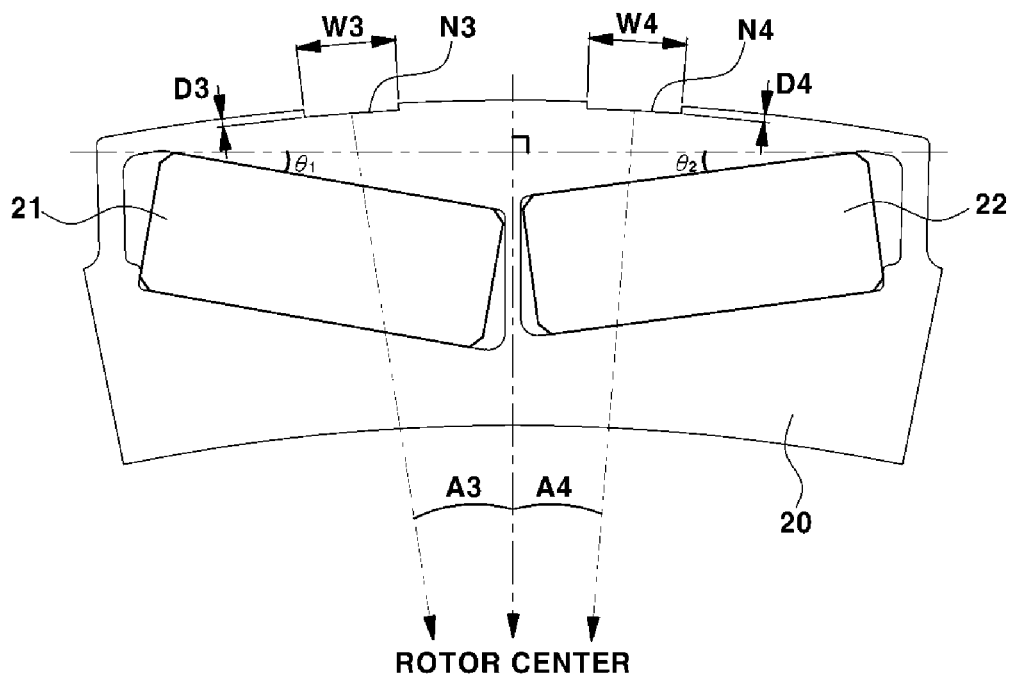
FIG. 3 is an enlarged diagram of a main portion Y of a rotor of the interior permanent magnet electric motor illustrated in FIG. 1.

FIG. 1 is a schematic plan diagram of an interior permanent magnet electric motor according to a preferred embodiment of the present disclosure, FIG. 2 is an enlarged diagram of a main portion X of a stator of the interior permanent magnet electric motor illustrated in FIG. 1, and FIG. 3 is an enlarged diagram of a main portion Y of a rotor of the interior permanent magnet electric motor illustrated in FIG. 1.

Referring to FIGS. 1 to 3, an interior permanent magnet electric motor according to an embodiment of the present disclosure may include a stator 10 in a ring shape and a rotor 20 coaxially disposed inside the stator with a gap interposed therebetween and having a plurality of permanent magnets 21, 22 fixed in the form of being buried therein to be spaced apart from each other along the outer circumference in the circumferential direction thereof.

Specifically, the rotor 20 according to a preferred embodiment of the present disclosure has a plurality of slot parts formed at the edge of a rotor core formed in a substantially cylindrical shape at an interval along the circumferential direction thereof, and each slot part has the plurality of permanent magnets 21, 22 forming a single magnetic pole formed thereon. In other words, at least one of the slot parts contains the plurality of permanent magnets (i.e., first and second permanent magnets) of the same polarity (e.g., "N"), and another one of the slot parts contains the plurality of permanent magnets of the same polarity (e.g., "S").

In addition, a plurality of V grooves is formed on the outer circumferential surface of the rotor 20 at a predetermined interval, and the V grooves are interposed between the respective slot parts.

The slot part may be configured to include two or more unit-slots, and is preferably configured to include a pair of unit-slots as in FIG. 2. In addition, the permanent magnets 21, 22 are inserted into the unit-slots, respectively. In other words, each of the plurality of slot parts preferably contains two "unit-slots" (i.e., individual slots), where each of the "unit-slots" is configured to receive one of the permanent magnets 21, 22.

The permanent magnets 21, 22 disposed in one slot part should form a single magnetic pole of N pole or S pole. Therefore, the permanent magnets 21, 22 having the same polarity are inserted into the unit-slots forming one slot part. In addition, as in FIG. 1, the slot part of the N pole and the slot part of the S pole are alternately disposed along the circumference of the rotor. Therefore, the permanent magnets 21, 22 having magnetic poles different from each other should be inserted into the neighboring slot parts.

The plurality of slot parts is equally disposed in the circumferential direction of the rotor core 21 to become symmetrical with respect to the rotational shaft of the rotor.

Meanwhile, the rotor according to a preferred embodiment of the present disclosure includes a pair of unit-slots in one slot part, and has an asymmetric structure configured so that the angles of the permanent magnets buried in the unit-slot have different values from each other.

Specifically, FIG. 3 illustrates an asymmetric permanent magnet buried type rotor. In this regard, FIG. 3 illustrates a structure in which the first permanent magnet 21 and the second permanent magnet 22 are inserted into one slot part including two unit-slots, respectively.

As illustrated in FIG. 3, the unit-slots in one slot part are formed so that the buried angles $\theta_1$, $\theta_2$ of the permanent magnets inserted therein may have different values from each other.

Herein, the buried angles $\theta_1$, $\theta_2$ of the permanent magnets mean an angle at which the rectangular permanent magnet is buried in the slot part with respect to an imaginary line. In this regard, the imaginary line for determining the buried angle of the permanent magnet may preferably be a line perpendicular to the central line penetrating the central portion of the corresponding slot part. In addition, as in FIG. 3, the imaginary line may be a line perpendicular to the central line penetrating a center partition wall for partitioning a pair of unit-slots, or may also be a line connecting the outside edges of the respective permanent magnets 21, 22 to each other.

Therefore, the buried angle of the permanent magnet in this embodiment means an angle formed by one surface of the permanent magnet with respect to the imaginary line as in FIG. 3. Therefore, in FIG. 3, the left first permanent magnet 21 has a first buried angle $\theta_1$, the right second permanent magnet 22 has a second buried angle $\theta_2$, and according to a preferred embodiment of the present disclosure, the first buried angle $\theta_1$ should be formed to have a different value from the second buried angle $\theta_2$.

The asymmetric permanent magnet buried type rotor structure as in FIG. 3 is basically a V-type rotor structure, and may provide a relatively excellent motor efficiency as compared to the I-type rotor structure that has been disclosed in Korean Patent Laid-open Publication No. 10-2016-0053560. Specifically, in the V-type under the same current condition, as compared to the I-type rotor, the q-axis magnetic resistance is reduced to increase the inductance, thereby increasing the reluctance torque, such that it is possible to reduce the current when the same torque is generated, thereby enhancing efficiency.

However, in the V-type, there is a disadvantage in that the level of unbalance of the magnetic flux in the gap increases, thereby deteriorating the torque ripple, and the asymmetric permanent magnet buried type rotor according to a preferred embodiment of the present disclosure applies an asymmetric structure differentiating the buried angle of the permanent magnet, thereby effectively reducing the torque ripple. Therefore, according to this embodiment, it is possible to disperse the magnetic flux concentrated saturation region while maximizing the utilization of the reluctance torque when the torque is generated, thereby effectively reducing the torque ripple.

Hereinafter, various experimental examples capable of confirming the features of the interior permanent magnet electric motor according to various embodiments of the present disclosure will be described.

As described above, the interior permanent magnet electric motor according to various embodiments of the present disclosure may set the buried angles of the permanent magnet differently from each other, thereby appropriately reducing the torque ripple. The torque ripple may mechanically have a cycle corresponding to the least common multiple of the number of poles and the number of slots in the electric motor.

The following experimental example is based on an electric motor having 16 poles and 24 slots. In particular, the cogging torque of the electric motor used in this experiment is a cogging torque of 48 cycles, which is the least common multiple of 16 and 24. In particular, since the degree mainly affecting the NVH of a vehicle is $48^{th}$ and $96^{th}$ that is a multiple thereof, the result of measuring the sum of the $48^{th}$ and $96^{th}$ cogging torques is used in the following experimental example. In addition, since the torque ripple occurs in the degree of "(the number of pole/2)*(three-phase*2)," the measured results for the $48^{th}$ and $96^{th}$, which is a multiple thereof, torque ripples are used with respect to 16 poles.

Experimental Example 1

As illustrated in FIG. 3, motor efficiency and torque ripple were measured for the asymmetric permanent magnet buried type rotors in which two permanent magnets having different buried angles of the permanent magnet were inserted into one slot part. In particular, the experiment was performed while changing the buried angle of the permanent magnet of the rotor to 5 degrees, 7 degrees, and 10 degrees.

In addition, the I-type rotor in which the buried angle of the permanent magnet is '0' and the V-type rotor of a symmetric structure in which the buried angle of the permanent magnet is constant were also used as a comparative example, and the respective motor efficiencies and torque ripples were measured.

Table 1 below illustrates the motor efficiency according to the buried angle of the permanent magnet, Tables 2 and 3 illustrate the torque ripple according to the buried angle of the permanent magnet, and Table 2 illustrates the $48^{th}$ torque ripple and Table 3 illustrates the $96^{th}$ torque ripple, respectively.

An experiment was performed for the rotor and the stator having no notch, and the motor efficiency and the $48^{th}$ and $96^{th}$ torque ripples for 10 examples were measured while variously applying the buried angle of the first permanent magnet and the buried angle of the second permanent magnet as 0, 5, 7, 10.

TABLE 1

| | | Motor efficiency [%] | | | |
| --- | --- | --- | --- | --- | --- |
| | | Buried angle of second permanent magnet | | | |
| | | 0 | 5 | 7 | 10 |
| Buried angle of first permanent magnet | 0 | 96.03 | | | |
| | 5 | | 96.10 | 96.12 | 96.14 |
| | 7 | | 96.10 | 96.13 | 96.15 |
| | 10 | | 96.08 | 96.12 | 96.15 |

TABLE 2

Torque ripple [%, 48th]

| | | Buried angle of second permanent magnet | | | |
|---|---|---|---|---|---|
| | | 0 | 5 | 7 | 10 |
| Buried angle of first permanent magnet | 0 | 3.87 | | | |
| | 5 | | 4.77 | 6.72 | 8.93 |
| | 7 | | 3.90 | 5.80 | 8.43 |
| | 10 | | 3.09 | 4.54 | 7.34 |

TABLE 3

Torque ripple [%, 96th]

| | | Buried angle of second permanent magnet | | | |
|---|---|---|---|---|---|
| | | 0 | 5 | 7 | 10 |
| Buried angle of first permanent magnet | 0 | 1.07 | | | |
| | 5 | | 1.74 | 2.10 | 2.24 |
| | 7 | | 1.73 | 2.03 | 2.31 |
| | 10 | | 1.81 | 1.93 | 2.28 |

As illustrated in Table 1 above, the asymmetric permanent magnet buried type rotor structure exerted entirely improved motor efficiency as compared to the I-type rotor. It was confirmed that when comparing with the V-type rotor of the symmetrical structure, that is, the example where the buried angles of the first and second permanent magnet were all 5 degrees, the example where the buried angles of the first and second permanent magnet were all 7 degrees and the example where the buried angles of the first and second permanent magnet were all 10 degrees, the motor efficiencies thereof were substantially equal to each other, and it was confirmed that in the example where the buried angle of the second permanent magnet at the right side of the slot part was greater, it had a little better performance in terms of the motor efficiency.

In addition, as may be confirmed in Table 2, it could be confirmed that the torque ripple was sufficiently reduced when the buried angle of the right second permanent magnet was formed at an angle smaller than the buried angle of the left first permanent magnet in the experimental result for the 48th torque ripple that was a torque ripple firstly occurred, with respect to the electric motor of 16 poles and 24 slots.

In this regard, Table 1 to Table 3 are the results measured while rotating the electric motor counterclockwise, and as may be confirmed in Table 2, in the case that the rotor rotates counterclockwise, when the buried angle of the second permanent magnet was smaller than the buried angle of the first permanent magnet, it may be seen that the torque ripple reduction effect was significantly large.

In such an effect, when the electric motor rotates counterclockwise, the magnetic flux of the left portion of the rotor core was saturated, and according to this embodiment, as in FIG. 3, since the buried angle of the right second permanent magnet was set to be smaller than the buried angle of the left first permanent magnet, it is estimated that the torque ripple was reduced due to the relaxation effect of the left saturation region.

On the other hand, it could be confirmed to have the result opposite to the experimental result in Table 2 when the rotor rotated clockwise, and it was confirmed that when the buried angle of the second permanent magnet was greater than the buried angle of the first permanent magnet, the torque ripple reduction effect was effectively expressed.

Likewise, Table 3 illustrates the result of measuring the 96th torque ripple, and it was confirmed that the 96th torque ripple also exerted the excellent torque ripple reduction effect when the buried angle of the second permanent magnet was smaller than the buried angle of the first permanent magnet with respect to the counterclockwise rotation thereof. As in the 48th torque ripple as described above, it was confirmed that when the buried angle of the first permanent magnet was smaller than the buried angle of the second permanent magnet upon clockwise rotation, the torque ripple reduction effect was excellent.

In particular, summarizing the results of Table 1 to Table 3, it may be confirmed that when the buried angle $\theta_1$ of the first permanent magnet is formed at 7 degrees and the buried angle $\theta_2$ of the second permanent magnet is formed at 5 degrees with respect to the counterclockwise rotation thereof, the torque ripple may be remarkably reduced while maintaining the motor efficiency at a certain level.

Therefore, according to a preferred embodiment of the present disclosure, it may be confirmed that with respect to the rotation direction of the rotor, when the buried angle of the permanent magnet that is firstly present with respect to the rotation direction thereof is formed to be greater than the buried angle of the permanent magnet that is secondly present, it is more effective to reduce the torque ripple.

Therefore, in the rotor having the counterclockwise rotation as the main rotation direction, it is preferable that the buried angle of the first permanent magnet is formed to be greater than the buried angle of the second permanent magnet. On the other hand, in the rotor having the clockwise rotation as the main rotation direction, it is preferable that the buried angle of the second permanent magnet is formed to be greater than the buried angle of the first permanent magnet.

In addition, in a permanent magnet buried type rotor according to another embodiment of the present disclosure, two or more notches are formed on the outer circumference of the rotor, and the shapes of the notches are configured variously. In this case, according to the asymmetric permanent magnet buried type rotor structure as described above, the buried angles of the permanent magnets of each slot part should be formed differently from each other.

Specifically, as illustrated in FIGS. 1 to 3, according to a preferred embodiment of the present disclosure, the stator 10 and the rotor 20 have a plurality of notches N1, N2, N3, N4 on the surfaces facing each other, respectively. The notches N1, N2, N3, N4 may be formed along the height direction perpendicular to the circumferential direction of the stator 10 or the rotor 20, and may have a cross section in a specific shape (rectangular shape or trapezoidal shape with increasing or decreasing width).

The stator 10 may include a yoke 11 in a ring shape, a plurality of teeth 12 inwardly extended from the yoke 11, and a shoe 13 formed on the end portion of the teeth 12 to face the rotor 20. In the structure of the electric motor, the notches N1, N2 may be formed on the rotor facing surface of the shoe 13.

The notches N1, N2 is formed for each stator 10, in particular, shoe 13 at a certain number, and the characteristic of the torque ripple of the electric motor varies according to the number of notches formed for each shoe 13.

For example, when two notches are formed on the shoe of the stator 10, the cogging torque reduction characteristic of the electric motor varies by the structural parameters of the stator notch N1 and the rotor notch N2, that is, the factors such as the widths W1, W2, the interval between the stator notch and the rotor notch, and the depths D1, D2 of the stator notch N1 and the rotor notch N2.

Likewise, the torque ripple characteristic of the electric motor also varies according to the number of notches formed on the rotor 20.

For example, when two notches are formed on the slot part of the rotor 20, the cogging torque reduction characteristic of the electric motor varies by the factors such as the number of notches N3, N4, widths W3, W4, depths D3, D4, and an interval therebetween. In particular, in the rotor 20, the same number of notches N3, N4 may be formed in a region each adjacent to the permanent magnets 21, 22 of each polarity provided in the rotor 20 to vary the cogging torque reduction characteristic.

The inventor of the present disclosure has confirmed through the experiments that the torque ripple reduction may be achieved by forming a notch on the stator 10 and the rotor 20, respectively, and in particular, has confirmed that it is possible to preferably form two stator notches N1, N2 for each shoe of the stator 10 and to form a pair of rotor notches N3, N4 corresponding to the permanent magnets 21, 22 of one polarity of the rotor 20, respectively, thereby reducing the torque ripple.

In this regard, in order to obtain the optimum structures for the rotor notch and the stator notch, the experiment was performed for the example of applying a pair of notch structures to the I-type rotor, and also applying a pair of notch structures to the teeth of the stator corresponding thereto as a reference.

The experimental example is the same as the example in FIGS. 1 to 3 except that it is the I-type that the buried angle of the permanent magnet is '0.'

Hereinafter, a change in the characteristics of the electric motor according to a change in the notch structure will be described with reference to various experimental examples.

Experimental Example 2

Changes in a primary cogging torque and a secondary cogging torque were measured by fixing the number of notches formed on the stator 10 and the rotor 20 to two, respectively, and changing the positions of the notches formed on the stator 10 and the rotor 20.

That is, the widths W1, W2 of the two notches N1, N2 formed on the stator 10 and the widths W3, W4 of the rotor notches N3, N4 formed by two for each one polarity permanent magnet of the rotor 20 were fixed. In addition, the changes in the primary cogging torque and the secondary cogging torque were measured by changing angles A1, A2 formed by the circumferential directional center of the shoe 13 and the center of one stator notches N1, N2 (with respect to the center of the stator 10), and changing angles A3, A4 formed by the circumferential directional center of the slot part of the rotor, that is, the center of a partition wall part for partitioning the permanent magnets and the center of the rotor notches N3, N4 nearest thereto (with respect to the center of the rotor 20). In particular, the stator notches N1, N2 were formed at the same angle as each other, and the rotor notches N3, N4 were also formed at the same angle as each other.

The changes in the primary cogging torque and the secondary cogging torque measured in the Experimental Example 2 were illustrated as in Table 4 and Table 5 below.

TABLE 4

Cogging torque [primary, Nm]

| Rotor Notch Angle [deg] | Stator Notch Angle [deg] | | | | | | | | |
|---|---|---|---|---|---|---|---|---|---|
| | 2 | 2.4 | 2.8 | 3.2 | 3.6 | 4 | 4.4 | 4.8 | 5.2 |
| 2 | 2.92 | 2.06 | 1.31 | 0.77 | 0.47 | 0.45 | 0.99 | 1.92 | 2.99 |
| 2.4 | 3.68 | 2.50 | 1.47 | 0.77 | 0.43 | 0.50 | 1.31 | 2.55 | 3.89 |
| 2.8 | 4.32 | 2.88 | 1.62 | 0.74 | 0.40 | 0.57 | 1.58 | 3.09 | 4.66 |
| 3.2 | 4.77 | 3.15 | 1.73 | 0.75 | 0.40 | 0.63 | 1.80 | 3.49 | 5.23 |
| 3.6 | 5.01 | 3.30 | 1.79 | 0.77 | 0.42 | 0.74 | 1.92 | 3.71 | 5.52 |
| 4 | 4.95 | 3.27 | 1.79 | 0.80 | 0.45 | 0.72 | 1.93 | 3.69 | 5.48 |
| 4.4 | 4.64 | 3.08 | 1.74 | 0.82 | 0.50 | 0.80 | 1.86 | 3.48 | 5.13 |
| 4.8 | 4.08 | 2.75 | 1.61 | 0.84 | 0.55 | 0.73 | 1.66 | 3.05 | 4.49 |
| 5.2 | 3.33 | 2.29 | 1.42 | 0.82 | 0.57 | 0.66 | 1.37 | 2.46 | 3.64 |

TABLE 5

Cogging torque [secondary, Nm]

| Rotor Notch Angle [deg] | Stator Notch Angle [deg] | | | | | | | | |
|---|---|---|---|---|---|---|---|---|---|
| | 2 | 2.4 | 2.8 | 3.2 | 3.6 | 4 | 4.4 | 4.8 | 5.2 |
| 2 | 0.55 | 0.82 | 3.31 | 5.72 | 6.79 | 6.15 | 3.77 | 1.28 | 0.26 |
| 2.4 | 0.33 | 0.79 | 2.85 | 4.86 | 5.77 | 5.24 | 3.24 | 1.13 | 0.19 |
| 2.8 | 0.09 | 0.75 | 2.01 | 3.26 | 3.85 | 3.54 | 2.24 | 0.88 | 0.02 |
| 3.2 | 0.51 | 0.72 | 1.15 | 1.65 | 1.91 | 1.80 | 1.25 | 0.65 | 0.28 |
| 3.6 | 0.75 | 0.68 | 0.65 | 0.70 | 0.78 | 0.74 | 0.68 | 0.55 | 0.47 |
| 4 | 0.69 | 0.66 | 0.71 | 0.85 | 0.98 | 0.99 | 0.81 | 0.61 | 0.49 |
| 4.4 | 0.35 | 0.65 | 1.30 | 2.01 | 2.40 | 2.22 | 1.58 | 0.81 | 0.33 |
| 4.8 | 0.08 | 0.66 | 2.13 | 3.61 | 4.35 | 4.04 | 2.61 | 1.05 | 0.06 |
| 5.2 | 0.43 | 0.70 | 2.81 | 4.88 | 5.90 | 5.44 | 3.42 | 1.23 | 0.16 |

As illustrated in Table 4 and Table 5, the primary and secondary cogging torques were changed according to the positions (angles) of the two notches N1, N2 formed for each shoe of the stator 10 and the positions (angles) of the two notches N3, N4 formed for each permanent magnet of the rotor 20. Considering the changes in the magnitudes of the primary cogging torque and the secondary cogging torque illustrated in Table 4 and Table 5 together, it is determined that the angles A1, A2 formed by the centers of the stator notches N1, N2 and the circumferential directional center of the shoe 13 are preferably about 2.4 to 4.8 degrees, and the angles A3, A4 formed by the circumferential directional center of the slot part and the centers of the rotor notches N3, N4 nearest thereto are preferably about 2.8 to 4.8 degrees.

Experimental Example 3

Changes in the cogging torque were measured by fixing the number, widths, positions, and the like of the notches of the rotor 20, and by changing the widths W1, W2 of the two notches N1, N2 formed on the stator 10 and the angles A1, A2 formed by the circumferential directional center of the shoe 13 and the centers of the respective stator notches N1, N2 (with respect to the center of the stator 10). In particular, the stator notches N1, N2 were formed at the same width and angle as each other.

The result of Experimental Example 3 is illustrated in Table 6 below.

TABLE 6

Cogging torque [primary + secondary, Nm]

| Stator Notch Width [mm] | Stator Notch Angle [deg] | | | | | | | | |
|---|---|---|---|---|---|---|---|---|---|
| | 2 | 2.4 | 2.8 | 3.2 | 3.6 | 4 | 4.4 | 4.8 | 5.2 |
| 1 | 5.85 | 5.24 | 4.64 | 4.20 | 4.10 | 4.38 | 4.94 | 5.63 | 6.57 |
| 1.2 | 5.85 | 5.07 | 4.34 | 3.79 | 3.68 | 3.98 | 4.61 | 5.47 | 6.54 |
| 1.4 | 5.85 | 4.91 | 4.04 | 3.40 | 3.26 | 3.58 | 4.29 | 5.27 | 6.50 |
| 1.6 | 5.84 | 4.74 | 3.72 | 2.99 | 2.84 | 3.19 | 3.95 | 5.07 | 6.44 |
| 1.8 | 5.83 | 4.57 | 3.41 | 2.61 | 2.42 | 2.80 | 3.62 | 4.88 | 6.36 |
| 2 | 5.82 | 4.40 | 3.10 | 2.23 | 2.01 | 2.39 | 3.29 | 4.68 | 6.26 |
| 2.2 | 5.80 | 4.19 | 2.79 | 1.85 | 1.61 | 2.01 | 2.96 | 4.49 | 6.15 |
| 2.4 | 5.77 | 4.06 | 2.55 | 1.57 | 1.21 | 1.61 | 2.68 | 4.35 | 6.05 |
| 2.6 | 5.75 | 3.89 | 2.27 | 1.25 | 0.95 | 1.40 | 2.42 | 4.17 | 5.93 |
| 2.8 | 5.73 | 3.66 | 2.01 | 0.95 | 0.86 | 1.00 | 2.16 | 4.02 | 5.76 |
| 3 | 5.69 | 3.54 | 1.74 | 0.82 | 1.27 | 0.80 | 1.89 | 3.84 | 5.56 |

As illustrated in Table 6, the preferred cogging torque values less than 4 Nm could be obtained in a range in which the angles A1, A2 formed by the circumferential directional center of the shoe 13 and the centers of the respective stator notches N1, N2 were 2.4 degrees to 4.8 degrees. In addition, the preferred cogging torque values less than 4 Nm could be obtained in a range in which the widths W1, W2 of the notches N1, N2 were 1.2 mm to 3.0 mm.

There is also the case that the preferred cogging torque is not achieved in the relationship between the widths W1, W2 of the two notches N1, N2 formed on the stator 10 and the angles A1, A2 formed by the circumferential directional center of the shoe 13 and the centers of the respective stator notches N1, N2, but when one of the two conditions is achieved, the preferred cogging torque may be achieved by appropriately adjusting the other one, such that it is possible to set the corresponding range to a range capable of all obtaining the preferred cogging torque.

Therefore, when two notches N1, N2 are formed on the shoe 13 of the stator 10, as in the following Equation 1 and Equation 2, the angle A1 formed by the circumferential directional center of the shoe 13 and the center of one stator notch N1 and the width W1 of the stator notch N1 may be determined.

$$\frac{24}{S} \times 2.4 \leq A_1 \leq \frac{24}{S} \times 4.8 \qquad \text{Equation 1}$$

$$\frac{24}{S} \times \frac{W_s}{16} \times 1.2 \leq W_1 \leq \frac{24}{S} \times \frac{W_s}{16} \times 3.0 \qquad \text{Equation 2}$$

Herein, S refers to the number of slots of the stator, and $W_s$ to the circumferential directional width of the shoe 13.

In addition, the angle A2 and the width W2 of the other rotor notch N2 may also be determined in the same manner as the angle A1 and the width W1 of the rotor notch N1.

As described above, considering that the experimental example of this application was based on the electric motor having 16 poles and 24 slots, and considering that although the number of poles and the number of slots were changed, almost similar features could be obtained linearly, a scaling factor was applied to a boundary numerical value.

Experimental Example 4

Similar to the Experimental Example 3, changes in the cogging torques were measured by fixing the number, widths, positions, and the like of the notches N1, N2 of the stator 10 and changing the widths W3, W4 of the rotor notches N3, N4 formed by two for each one polarity permanent magnet of the rotor 20 and the angles A3, A4 formed by the circumferential directional center of the slot part and the centers of the rotor notches N3, N4 nearest thereto (with respect to the center of the rotor 20).

The result of the Experimental Example 4 is illustrated in Table 7 below.

TABLE 7

Cogging torque [primary + secondary, Nm]

| Rotor Notch Width [mm] | Rotor Notch Angle [deg] | | | | | | | | |
|---|---|---|---|---|---|---|---|---|---|
| | 2 | 2.4 | 2.8 | 3.2 | 3.6 | 4 | 4.4 | 4.8 | 5.2 |
| 1 | 4.89 | 4.42 | 3.71 | 3.04 | 2.66 | 2.72 | 3.16 | 3.77 | 4.90 |
| 1.4 | 5.45 | 4.80 | 3.75 | 2.75 | 2.17 | 2.27 | 2.97 | 3.90 | 5.45 |
| 1.8 | 5.97 | 5.16 | 3.81 | 2.45 | 1.71 | 1.86 | 2.80 | 4.13 | 5.94 |
| 2.2 | 6.45 | 5.51 | 3.87 | 2.23 | 1.32 | 1.49 | 2.66 | 4.30 | 6.44 |
| 2.6 | 6.84 | 5.78 | 3.91 | 2.04 | 0.99 | 1.19 | 2.49 | 4.47 | 6.78 |
| 3 | 7.10 | 5.97 | 3.96 | 1.95 | 0.81 | 0.99 | 2.46 | 4.53 | 7.00 |
| 3.4 | 7.29 | 6.12 | 3.99 | 1.85 | 0.67 | 0.92 | 2.44 | 4.61 | 7.17 |
| 3.8 | 7.39 | 6.21 | 4.08 | 1.87 | 0.66 | 0.91 | 2.47 | 4.68 | 7.00 |
| 4.2 | 7.35 | 6.21 | 4.14 | 1.97 | 0.78 | 1.02 | 2.56 | 4.78 | 6.94 |
| 4.6 | 7.23 | 6.15 | 4.19 | 2.14 | 1.01 | 1.21 | 2.69 | 4.78 | 6.70 |
| 5 | 6.99 | 6.01 | 4.23 | 2.43 | 1.34 | 1.52 | 2.85 | 4.75 | 6.34 |

As illustrated in Table 7, the preferred cogging torque values less than 4 Nm could be obtained in a range in which the angles A3, A4 formed by the circumferential directional center of the slot part and the centers of the rotor notches N3, N4 nearest thereto were 2.8 degrees to 4.8 degrees. In addition, the preferred cogging torque values less than 4 Nm could be obtained in a range in which the widths W3, W4 of the rotor notches N3, N4 were 1.0 mm to 5.0 mm.

Summarizing by applying the criteria applied to the Experimental Example 3 in the same manner, when the two notches N3, N4 are formed on the rotor 20, as in the following Equation 3 and Equation 4, the angles A3, A4 formed by the circumferential directional center of the slot part and the centers of the rotor notches N3, N4 nearest thereto and the widths W3, W4 thereof may be determined.

$$\frac{16}{P} \times 2.8 \leq A_3 \leq \frac{16}{P} \times 4.8 \qquad \text{Equation 3}$$

$$\frac{16}{P} \times \frac{R}{100} \times 1.0 \leq W_s \leq \frac{16}{P} \times \frac{R}{100} \times 5.0 \qquad \text{Equation 4}$$

Herein, P refers to the number of poles of the rotor 20, and R to the radius of the rotor.

In addition, as in the Equations 3 and 4, the angle A4 and the width W4 of the other rotor notch N4 may also be determined in the same manner as the angle A3 and the width W3 of the rotor notch N3.

Experimental Example 5

As in FIG. 3, in the asymmetric permanent magnet buried type rotor in which the buried angle $\theta_1$ of the first permanent magnet of the rotor slot part and the buried angle $\theta_2$ of the second permanent magnet thereof are different from each other, the cogging torques were measured by forming the pair of notches N1, N2 on the shoe of the teeth of the stator, forming the pair of notches N3, N4 on the slot part of the rotor, and changing the angles and widths of the notches N1, N2, N3, N4.

Table 8 illustrates the experimental results of the cogging torque and the torque ripple measured by changing the angles and widths of the stator notches N1, N2 and the rotor notches N3, N4 in the example where the buried angle $\theta_1$ of the first permanent magnet was 7 degrees, and the buried angle $\theta_2$ of the second permanent magnet was 5 degrees.

TABLE 8

|  | Angles (A1, A2) of rotor notches | Widths (W1, W2) of rotor notches | Angles (A3, A4) of stator notches | Widths (W3, W4) of stator notches | Cogging torque | Torque ripple (Max Torque) | Torque ripple (Low Torque) |
|---|---|---|---|---|---|---|---|
| Asymmetry | 4/3.5 | 4/3.5 | 2.5/3 | 3/2 | 1.5 | 2.9 | 3.5 |
| symmetry | 3.5 | 3.5 | 2.5 | 2 | 1.8 | 3.6 | 7 |
|  | 4 | 3.5 | 2.5 | 2 | 1.8 | 3.6 | 7.6 |
|  | 3.5 | 3.5 | 3 | 2 | 0.7 | 3.3 | 6.8 |
|  | 3.5 | 4 | 2.5 | 2 | 1.9 | 3.6 | 7.3 |
|  | 4 | 4 | 2.5 | 2 | 1.9 | 3.7 | 7.9 |
|  | 3.5 | 3.5 | 2.5 | 3 | 1.2 | 3.1 | 7.4 |
|  | 3.5 | 3.5 | 3 | 3 | 0.4 | 2.8 | 8.9 |

As illustrated in Table 8, it may be confirmed that when the width and the angle of the rotor notch and the width and the angle of the stator notch are formed asymmetrically, the torque ripple is reduced as compared to when the left and right width and angle of the respective notches are formed symmetrically, and in particular, it may be seen that the torque ripple in a low torque region is remarkably reduced.

In summary, according to a preferred embodiment of the present disclosure, when the electric motor is configured to include the asymmetric permanent magnet buried type rotor in which the buried angle $\theta_1$ of the first permanent magnet of the rotor slot part and the buried angle $\theta_2$ of the second permanent magnet thereof are different from each other, it is possible to sufficiently implement the torque ripple (cogging torque) reduction effect while sufficiently enhancing the electric motor efficiency.

In addition, in applying the asymmetric permanent magnet buried type rotor structure, it is possible to form the pair of notches N3, N4 on the rotor slot part, and to adjust the widths and/or the angles thereof so that the notches become asymmetric, thereby further maximizing the torque ripple reduction effect.

While the present disclosure has been described with reference to the preferred embodiments, those skilled in the art will recognize that modifications and variations are possible in the elements of the disclosure without departing from the scope of the disclosure. In addition, many modifications may be made to the particular situation or material within the scope of the disclosure, without departing from the essential scope thereof. Therefore, the present disclosure is not limited to the detailed description of the preferred embodiments of the present disclosure, but includes all embodiments within the scope of the appended claims.

What is claimed is:

1. A rotor of an interior permanent magnet electric motor, comprising:
   a plurality of slot parts arranged at an edge of a rotor core in a circumferential direction of the rotor core, each of the slot parts including a pair of unit-slots;
   a first permanent magnet and a second permanent magnet, which form a single magnetic pole, wherein the first and second permanent magnets are respectively inserted into and fixed to the pair of unit-slots of one of the slot parts; and
   wherein the pair of the unit-slots of the one of the slot parts are separately formed in the rotor core,
   wherein the first and second permanent magnets arranged in the pair of unit-slots of the one of the slot parts form a V-shaped structure;
   wherein a pair of rotor notches are formed on the slot part of the rotor, and
   wherein a circumferential directional center of the rotor notches and a circumferential directional center of the slot part are formed to have an angle $A_{nr}$ with respect to a center of the rotor, wherein the $A_{nr}$ is determined by:

$$\frac{16}{P} \times 2.8 \leq A_{nr} \leq \frac{16}{P} \times 4.8$$

where P is the number of poles of the rotor.

2. The rotor of the interior permanent magnet electric motor of claim 1, wherein the rotor notches are asymmetric notches in which at least one of widths and angles thereof is different from each other.

3. The rotor of the interior permanent magnet electric motor of claim 2, wherein a circumferential directional width $W_r$ (a unit is mm) of the rotor notches is formed to have a width $W_{nr}$, wherein the width $W_{nr}$ is determined by:

$$\frac{16}{P} \times \frac{R}{100} \times 1.0 \leq W_{nr} \leq \frac{16}{P} \times \frac{R}{100} \times 5.0$$

where P is the number of poles of the rotor.

4. The rotor of the interior permanent magnet electric motor of claim 1, wherein a plurality of V-shaped grooves are formed on the outer circumferential surface of the rotor core in the circumferential direction thereof, and each of the V-shaped grooves is interposed between the slot parts.

5. The rotor of the interior permanent magnet electric motor of claim 1, wherein the first and second permanent magnets are disposed in the one of the slot parts to form a single magnetic pole of an N pole or an S pole such that the N pole or the S pole and additional poles of opposite polarity are alternately disposed along a circumference of the rotor.

6. The rotor of the interior permanent magnet electric motor of claim 1, wherein a buried angle $\theta_1$ of the first permanent magnet has a different angle from a buried angle $\theta_2$ of the second permanent magnet.

7. The rotor of the interior permanent magnet electric motor of claim 6, wherein with respect to a rotation direction of the rotor, the buried angle of a first one of the first and second permanent magnets in the rotation direction is greater than the buried angle of a second one of the first and second permanent magnets.

8. The rotor of the interior permanent magnet electric motor of claim 7, wherein when the rotation direction of the rotor is counterclockwise, the buried angle $\theta_1$ of the first permanent magnet is formed at an angle greater than the buried angle $\theta_2$ of the second permanent magnet.

9. The rotor of the interior permanent magnet electric motor of claim 8, wherein the buried angle $\theta_1$ of the first permanent magnet is 7 degrees, and the buried angle $\theta_2$ of the second permanent magnet is 5 degrees.

10. The rotor of the interior permanent magnet electric motor of claim 7, wherein when the rotation direction of the rotor is clockwise, the buried angle $\theta_2$ of the second permanent magnet is formed at an angle greater than the buried angle $\theta_1$ of the first permanent magnet.

11. The rotor of the interior permanent magnet electric motor of claim 6, wherein the buried angle $\theta_1$ of the first permanent magnet is an angle selected within a range of 5 degrees to 10 degrees.

12. The rotor of the interior permanent magnet electric motor of claim 6, wherein the buried angle $\theta_2$ of the second permanent magnet is an angle selected within a range of 5 degrees to 10 degrees.

13. The interior permanent magnet electric motor of claim 1, wherein a circumferential directional width $W_1$ (mm) of the stator notches is formed to have a width $W_{ns}$, wherein the width $W_{ns}$ is determined by:

$$\frac{24}{S} \times \frac{W_s}{16} \times 1.2 \leq W_{nr} \leq \frac{24}{S} \times \frac{W_s}{16} \times 3.0$$

where S is the number of slots of the stator, and $W_{ns}$ is the circumferential directional width of the shoe.

14. An interior permanent magnet electric motor, comprising:
a rotor, comprising:
a plurality of slot parts arranged at an edge of a rotor core in a circumferential direction of the rotor core, each of the slot parts including a pair of unit-slots;
a first permanent magnet and a second permanent magnet, which form a single magnetic pole, wherein the first and second permanent magnets are respectively inserted into and fixed to the pair of unit-slots of one of the slot parts; and
a pair of rotor notches formed on each of the slot parts at an outer surface of the rotor core and having a height extending perpendicular to the circumferential direction of the rotor core, wherein the pair of rotor notches corresponds to the first permanent magnet and the second permanent magnet of one polarity of the rotor core, respectively;
wherein the pair of the unit-slots of the one of the slot parts are separately formed in the rotor core;
wherein the first and second permanent magnets arranged in the pair of unit-slots of the one of the slot parts form a V-shaped structure;
wherein the stator comprises a yoke in a ring shape, a plurality of teeth inwardly extended from the yoke, and a plurality of shoes formed on the end portion of the teeth to face an outer circumferential surface of the stator,
wherein a pair of stator notches formed toward the rotor are formed on each of the shoes;
wherein the pair of stator notches formed on each of the shoes are asymmetric notches in which at least one of widths and angles thereof is different from each other; and
wherein a circumferential directional center of the stator notches and a circumferential directional center of the shoes are formed to have an angle $A_{ns}$ (degrees) with respect to a center of the stator, wherein the angle $A_{ns}$ is determined by:

$$\frac{24}{S} \times 2.4 \leq A_{nr} \leq \frac{24}{S} \times 4.8$$

where S is the number of slots of the stator;
a stator in a ring shape coaxially disposed on an outer circumference of the rotor.

* * * * *